T. T. ANDERSON.
CULTIVATOR.
APPLICATION FILED AUG. 19, 1915.

1,275,356.

Patented Aug. 13, 1918.

Inventor
Thomas T. Anderson

UNITED STATES PATENT OFFICE.

THOMAS T. ANDERSON, OF BEMENT, ILLINOIS.

CULTIVATOR.

1,275,356.  Specification of Letters Patent.  Patented Aug. 13, 1918.

Application filed August 19, 1915. Serial No. 46,272.

*To all whom it may concern:*

Be it known that I, THOMAS T. ANDERSON, citizen of the United States, residing at Bement, in the county of Piatt and State of Illinois, have invented certain new and useful Improvements in Cultivators, of which the following is a specification.

This invention relates to implements for cultivating corn and other crops, and its object is to provide a highly efficient implement of this kind, capable of effectively operating in all sorts and conditions of soils, and to this end the invention consists in a novel combination and arrangement of parts to be hereinafter described and claimed.

In order that the invention may be better understood, reference is had to the accompanying drawings, in which—

Figure 1:
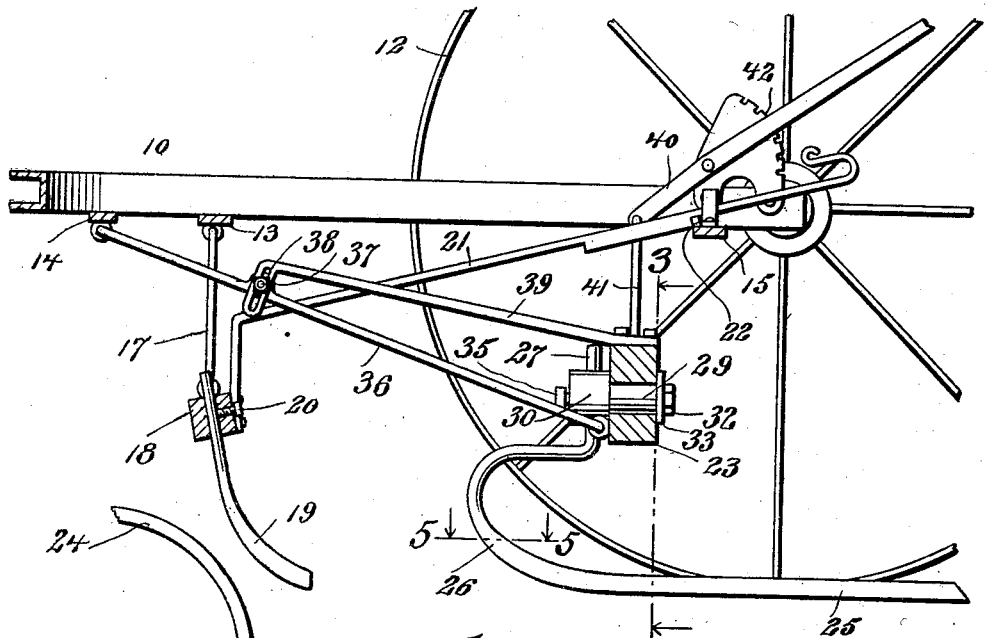
Figure 2:
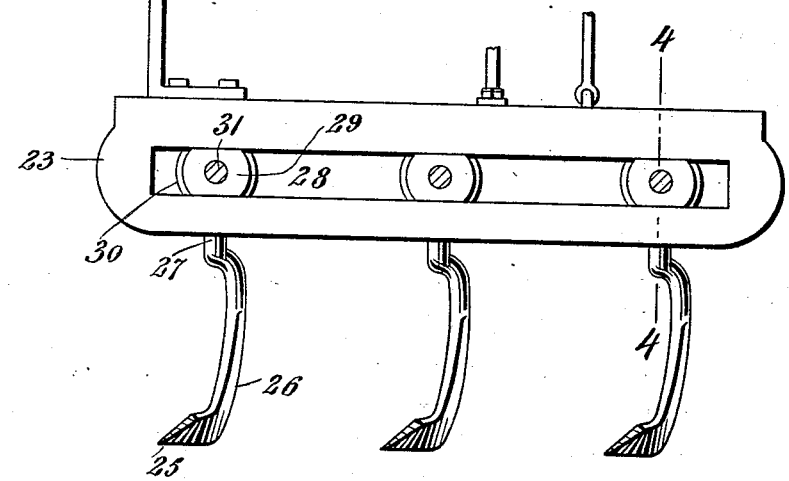

Figure 1 is a side elevation of the implement, partly in section, and Fig. 2 is a section on the line 3—3 of Fig. 1.

Referring specifically to the drawings, the frame of the implement comprises laterally spaced side bars 10 connected in front and having at their rear ends axles for the wheels 12. The side bars are also connected in front by two parallel cross bars 13 and 14, respectively, and by a rear cross bar 15, which latter is arched.

From the cross bar 13 is suspended, by links 17, a transverse beam 18 carrying harrow teeth 19 of the trailing type. The shanks of the teeth seat in apertures in the beam and are adjustably fastened therein by set screws 20. To the harrow beam are connected levers 21 which extend rearward over the cross bar 15, the latter having suitable catches 22 for locking the levers, the latter being for the purpose of adjusting the harrow beam.

Back of the harrow hereinbefore described is located a cultivator unit composed of two sets of blades, carried by supporting beams 23 which extend transversely of the implement, and in alinement, their inner ends being spaced and connected by an arch 24 to straddle the row of corn or other crop to be worked. The respective sets of cultivator blades are on opposite sides of the longitudinal center of the machine and work on opposite sides of the row, the blades being inclined to throw the dirt toward the center.

Each cultivator blade comprises a horizontal cutting or ground-engaging portion 25 having at its front end an upward curve 26 terminating in a straight upstanding shank 27. In the beam 23 is a horizontal slot 28 extending in the direction of the length of the beam. In this slot are slidably mounted blocks 29 carrying the clamps which secure the blades. Each blade clamp comprises a head 30 seating against the front face of the beam and having a lateral stem 31 passing rearward through the block 28 horizontally. The rear end of the stem projects from the block and is screw-threaded to receive a nut 32, between the base of which latter and the back of the beam is interposed a washer 33. The head 30 has a vertical aperture to receive the shank 27, and carries a set screw 35 for securing the latter. Each cultivator blade is mounted in this manner.

The cultivator beams 23 are connected to the front cross bar 14 by drag links 36 carrying, near their forward ends, bolts 37 slidably seating in slots 38 in the outer ends of brace bars 39 connected to the top of the beams and extending forwardly therefrom. The cultivator beams are thus loosely hung from the frame so that they may be raised or lowered, which is done by hand levers 40 connected by links 41 to the outer ends of the beams, said levers being carried by the cross bar 15 and having the usual locking means 42.

The cutting portion 25 of the cultivator blade is elongated and has a sharp cutting edge at the bottom and a lateral twist relative to the shank 27, the twist starting at the bend. The cutting edge continues upward along the bend for a measurable distance and as it is here in front, the blade penetrates the soil with the greatest ease. The blade is adjustable so that it may set at an angle to the ground, or to lie flat and horizontal, adjustment being possible from the horizontal to the vertical and any intermediate position. This adjustment may be effected by loosening the nut 32 and swinging the blade clamp 30 sidewise until the blade sets at the desired angle, the stem 31 of the clamp turning freely in the block 29 when the nut 32 is backed, and upon tightening up the bolt, the blade is securely held in adjusted position. The nut 32 also secures the block 29 in the slot 28, and said block is adjustable in the slot to vary the lateral spacing of the blades. The blades may also be raised and lowered upon loosening the set screws 35. The blades are set obliquely to the line of travel of the implement, and this angle may also be varied upon loosening the set screws 35.

The blades 19 are designed to cut the crust of the soil as this gives the most trouble when cultivating corn the first time, and after that, the blades may be removed and the cultivator used alone. By employing three blades 25 on each side of the cultivator, a large working area is obtained without giving the blades such an excessive obliquity that they are liable to gather roots and trash. The obliquity is just enough to throw the dirt sidewise and to shed roots and trash without bringing the same to the surface. The set of the blades is such that they will not catch on roots or stumps, and the implement therefore can be used with the best results in ground which is not perfectly clear, and where sod, stalks or stubble have been plowed under, the blades will not pull the same back to the surface.

If it is desired that no dirt be thrown and that the surface be left level, the cultivator blades will be set flat or horizontal. If a ridge is to be thrown to the corn, the blades are set to point straight down or to angle as shown in Fig. 2.

The blades can also be set so that the outer ones run at a greater depth than the inner ones.

By the construction of the blades and their adjustment as hereinbefore described, the implement can be made to operate effectively in all sorts and conditions of ground, and it therefore effectually serves the purpose for which it is designed.

I claim:

In a cultivator, an elongated horizontal blade having a bottom cutting edge which is horizontal and extends in the direction of the length of the blade, the forward end of the blade having an upward bend terminating in a vertical attaching shank, and the cutting edge being continued along the front edge of the upward bend, the body of the blade being disposed at an oblique angle to the vertical, and a support in which the blade shank is rotatable about a vertical axis, the support being rotatable about a horizontal axis.

In testimony whereof I affix my signature.

THOMAS T. ANDERSON.

Witnesses:
 GEO. M. THOMPSON,
 L. A. PETTON.